Figure 1:
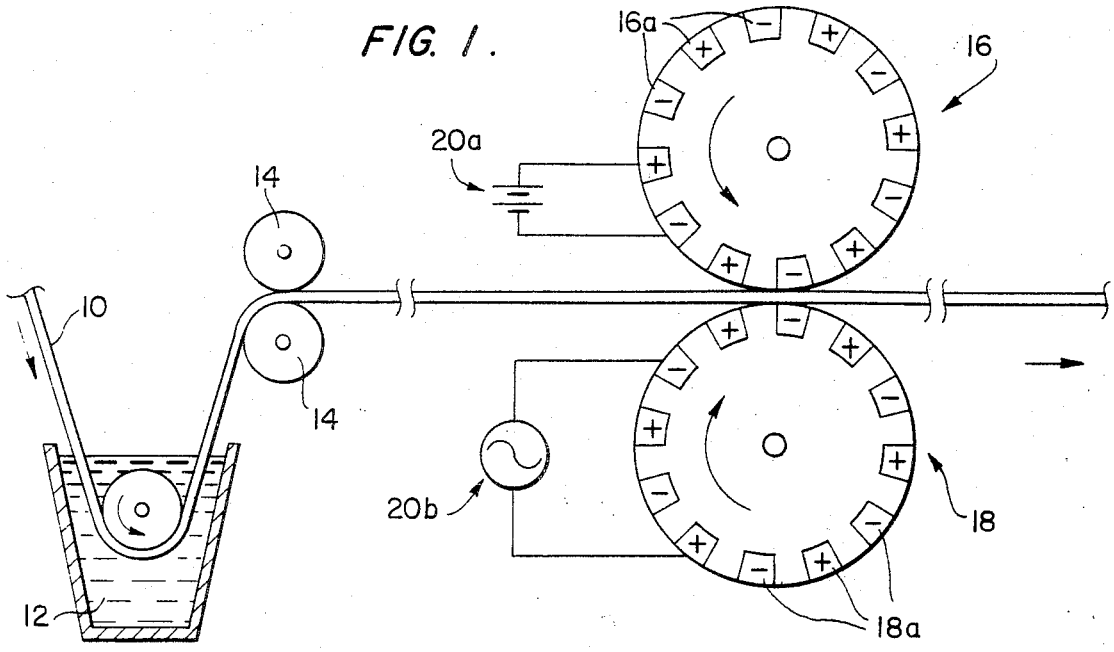
Figure 2:
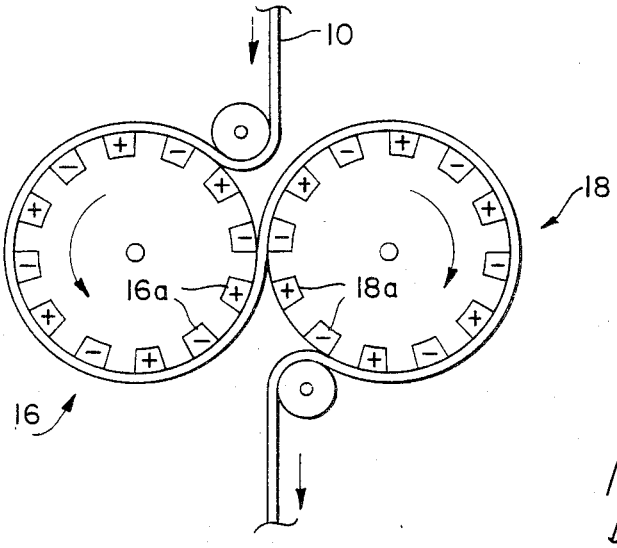
Figure 3:
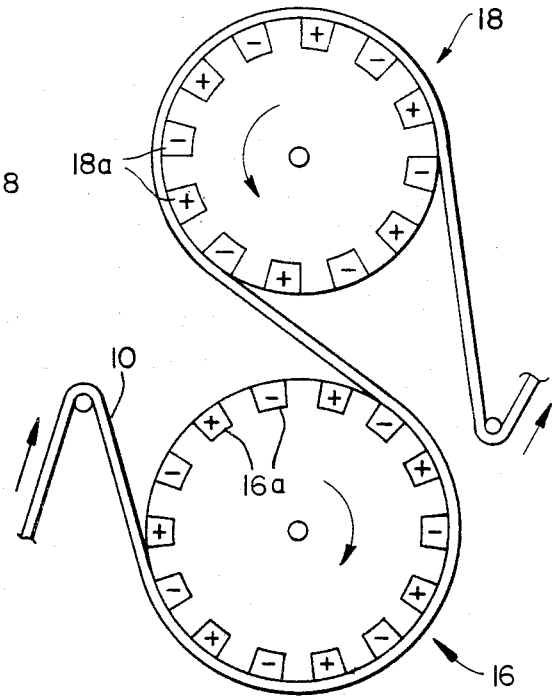
Figure 4:
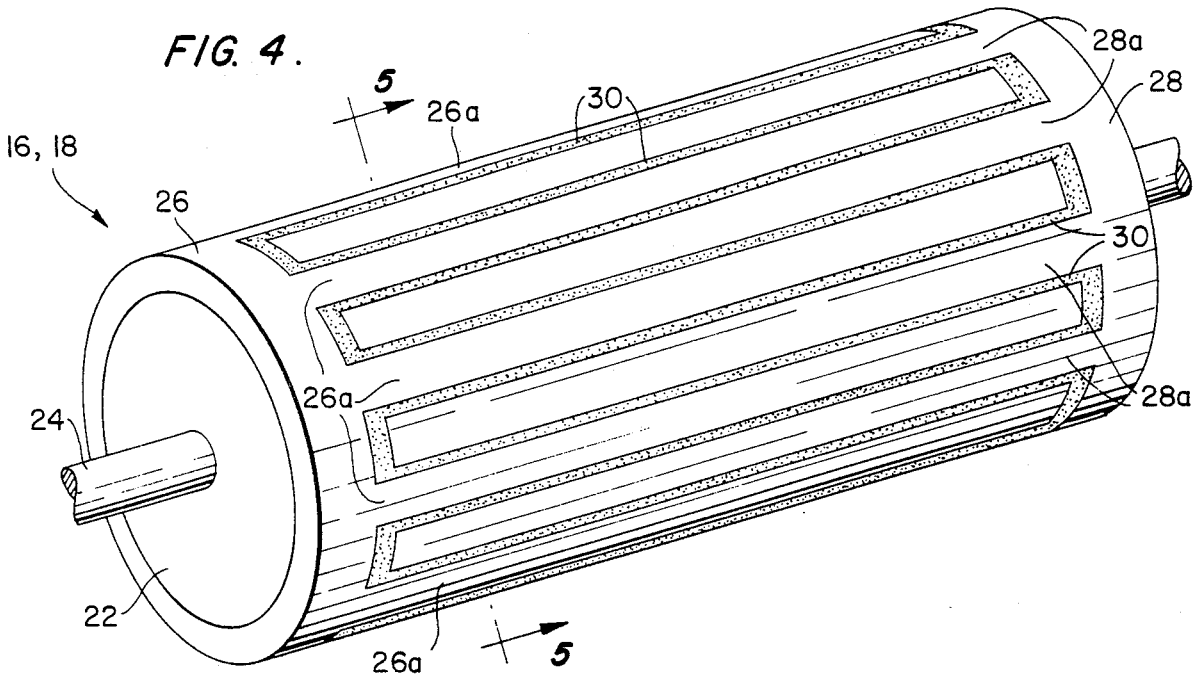
Figure 5:
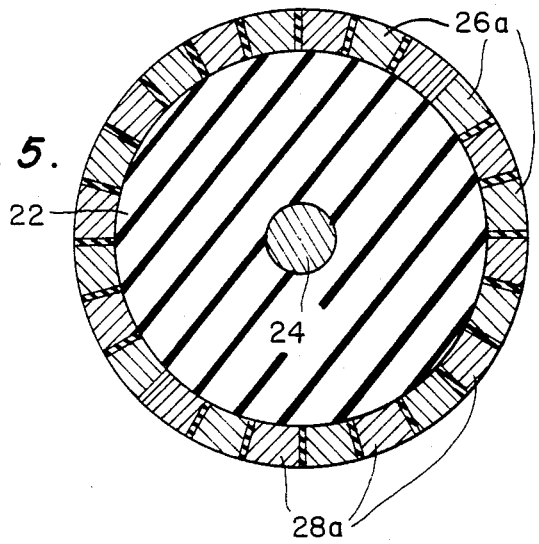
Figure 6:
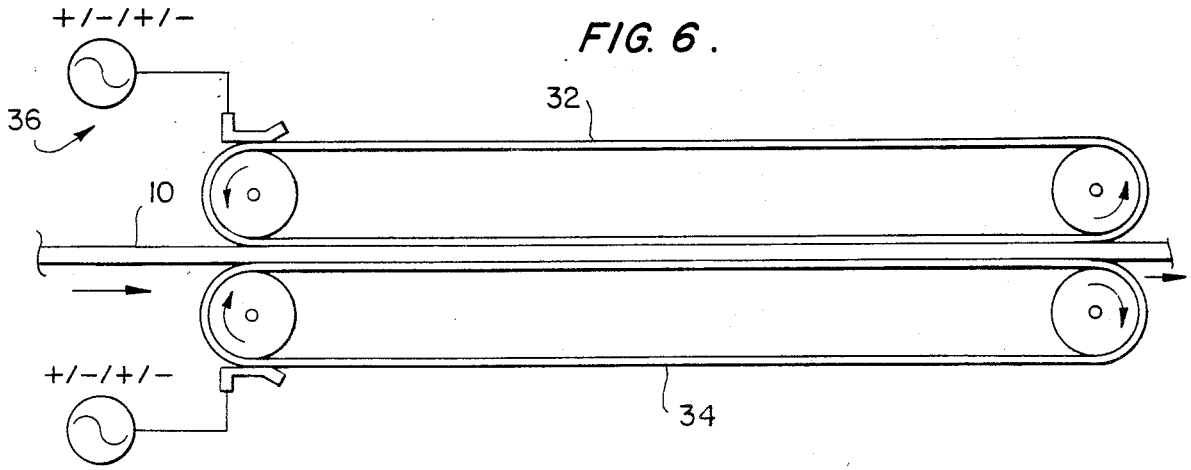

United States Defensive Publication [19] (H) [11] T106,001

Dellian [43] Nov. 5, 1985

[54] APPARATUS FOR THE ELECTROLYTIC GENERATION OF ALKALI ON BOTH SIDES OF A SUBSTRATE

[76] Inventor: Kurt A. Dellian, 1201 Wakefield Rd., Greensboro, N.C. 27410

[21] Appl. No.: 669,744

[22] Filed: Nov. 7, 1984

Related U.S. Application Data

[63] Continuation of Ser. No. 599,219, Apr. 13, 1984, abandoned, which is a continuation of Ser. No. 369,638, Apr. 19, 1982, abandoned.

[51] Int. Cl.[4] ..... C25D 17/00

[52] U.S. Cl. ..... 204/212

[57] ABSTRACT

An apparatus for the electrolytic generation of alkali on both sides of a substrate of hydrophilic material having applied thereto an alkali metal salt includes a pair of rollers positioned to rotate in contact with opposite sides of a substrate. Each roller has spaced around the periphery thereof a plurality of electrodes. Current of opposite polarities is applied to alternate electrodes on each roller, thereby to electrolytically generate alkali or acid on both sides of the substrate. The current may be DC, or alternatively may be AC at a low frequency. In an alternative arrangement the two rollers are replaced by a pair of endless belts of electrically conductive material positioned to move in contact with opposite sides of the substrate. An AC current at a low frequency is applied to the two belts, thereby to electrolytically generate alkali or acid on both sides of the substrate.

12 Claims, 2 Sheets Drawing,

22 Pages Specification

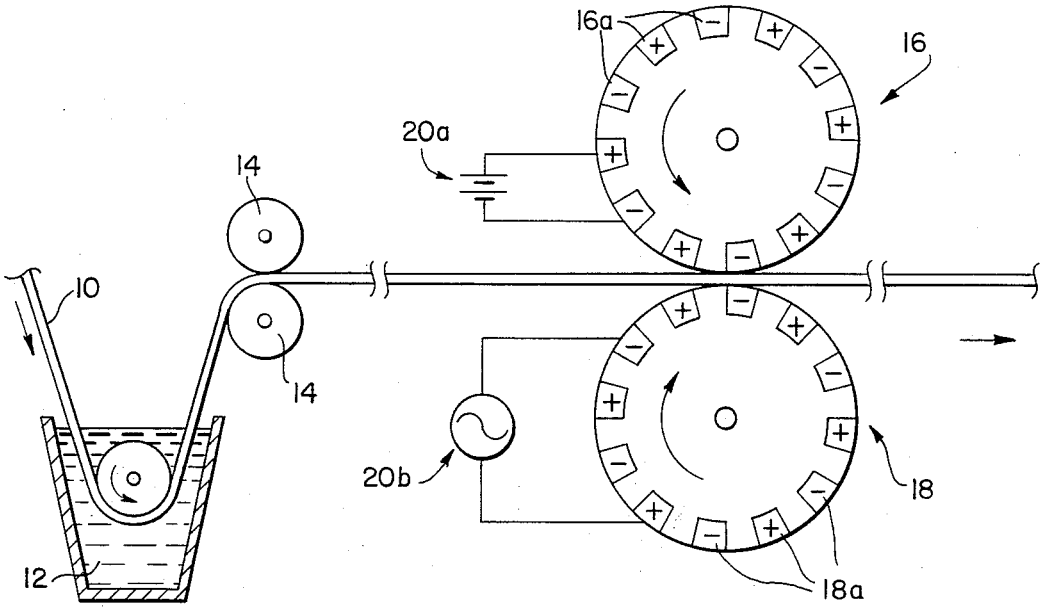

The file of this unexamined application may be inspected and copies thereof may be purchased (849 O.G. 1221, Apr. 9, 1968).